United States Patent
Yuan et al.

(10) Patent No.: US 6,190,720 B1
(45) Date of Patent: Feb. 20, 2001

(54) DISPERSIBLE STEROL COMPOSITIONS

(75) Inventors: C. Ronnie Yuan; Noel G. Rudie, both of Chelmsford, MA (US)

(73) Assignee: Opta Food Ingredients, Inc., Bedford, MA (US)

( * ) Notice: Under 35 U.S.C. 154(b), the term of this patent shall be extended for 0 days.

(21) Appl. No.: 09/333,745

(22) Filed: Jun. 15, 1999

(51) Int. Cl.⁷ .................................................. A23D 9/007
(52) U.S. Cl. .................................... 426/601; 552/544
(58) Field of Search ............................. 426/601; 552/544

(56) References Cited

U.S. PATENT DOCUMENTS

| | | | | |
|---|---|---|---|---|
| 3,865,939 | * | 2/1975 | Jandacek | 424/238 |
| 3,881,005 | * | 4/1975 | Thakkar | 424/238 |
| 3,926,840 | * | 12/1975 | Wendler | 252/356 |
| 4,160,850 | * | 7/1979 | Hallstrom | 426/601 |
| 4,195,084 | * | 3/1980 | Ong | 424/238 |
| 4,400,295 | * | 8/1983 | Ootsu | 252/356 |
| 5,502,045 | | 3/1996 | Miettinen et al. | 514/182 |
| 5,714,154 | * | 2/1998 | Hen-Ferrenbach | 424/401 |
| 5,723,137 | * | 3/1998 | Wahle | 424/401 |
| 5,725,803 | * | 3/1998 | Engel | 252/312 |
| 5,932,562 | * | 8/1999 | Ostlund | 514/78 |
| 5,952,393 | * | 9/1999 | Sorkin | 514/729 |
| 5,998,396 | * | 12/1999 | Nakano | 426/601 |
| 6,031,118 | * | 2/2000 | van Amerongen | 552/544 |
| 6,054,144 | * | 4/2000 | Burruano | 424/464 |
| 6,113,972 | * | 9/2000 | Corless | 426/613 |

FOREIGN PATENT DOCUMENTS

| | | | |
|---|---|---|---|
| 0839458 | * | 5/1997 | (EP) . |
| 0 594 612 B1 | | 8/1997 | (EP) . |
| 931115 | * | 7/1963 | (GB) . |
| 1298047 | * | 11/1972 | (GB) . |
| WO 96/38047 | * | 12/1996 | (WO) . |
| WO 98/19556 | | 5/1998 | (WO) . |
| 96/7616 | | 9/1996 | (ZA) . |

OTHER PUBLICATIONS

Ranken and Kill 1988 Food Industries Manual 23rd Edition Blackie Academic & Professional New York p. 302.*

Miettinen, T. A., et al., "Reduction of Serum Cholesterol with Sitostanol–Ester Margarine in a Mildly Hypercholesterolemic Population", *The New England Journal of Medicine*, 333(20): 1308–1311 (1995).

Jones, P.J.H., et al., "Comparable Efficacy of Hydrogenated Versus Nonhydrogenated Plant Sterol Esters on Circulating Cholesterol Levels in Humans", *Nutrition Reviews*, 56(8):245–252 (1998).

* cited by examiner

*Primary Examiner*—Carolyn Paden
(74) *Attorney, Agent, or Firm*—Hamilton, Brook, Smith & Reynolds, P.C.

(57) ABSTRACT

The present invention pertains to a food ingredient comprising one or more sterols, one or more fats and one or more emulsifiers, as well as to methods of making the food ingredient and food compositions comprising the food ingredient The food ingredient can be used as a cholesterol-lowering agent.

4 Claims, No Drawings

DISPERSIBLE STEROL COMPOSITIONS

BACKGROUND OF THE INVENTION

Growing consumer awareness of the health problems related to high cholesterol levels have created a demand for cholesterol lowering foods and dietary supplements. Plant sterols differ from cholesterol in several ways, such as by having ethyl or methyl groups or unsaturation in the side chain. These variations interfere with the absorption of cholesterol, and thus certain plant sterols are effective cholesterol-lowering agents in humans and animals. However, commercially available plant sterols with high melting points are difficult to disperse into food formulations. Due to the wax-like characteristics of these sterols, it is difficult to incorporate a large amount of the plant sterols into a food formulation without imparting objectionable sensory attributes.

SUMMARY OF THE INVENTION

The present invention relates to sterol-containing food ingredient compositions that are easy to disperse in water or oil, as well as to methods for making the sterol-containing food ingredient. The invention also relates to food products comprising the sterol-containing food ingredient of the invention, as well as to methods of making these food products. Preferably the food ingredient is a cholesterol-lowering agent.

The food ingredient of the invention comprises one or more sterols, one or more fats and one or more emulsifiers. The food ingredient of this invention is a homogenous composition which has a paste-like consistency and is dispersible in oil, water, or both oil and water with mild agitation and without heating. When dispersed in water or oil, the food ingredient forms a smooth dispersion suitable for food formulations.

In one embodiment of the invention, the sterol or sterols is (are) derived from a plant. Native plant sterols have been granted GRAS (Generally Recognized As Safe) status by the FDA. For example, the sterol can include, but is not limited to, sitosterol, sitosterin, campesterol, stigmasterol, and combinations thereof. In a particular embodiment, the sterol is selected from the group consisting of sitosterols and sitosterol derivatives. For example, the sterol can be β-sitosterol or a mixture thereof (e.g., a mixture of β-sitosterol and β-sitosterin).

The food ingredient also comprises one or more fats or lipids. Fats useful in the present invention include liquid oils, e.g., cuthea oil, cod liver oil, castor oil, mineral oil, jojoba oil, linseed oil, tung oil, soybean oil, canola oil, avocado oil, sunflower oil, vegetable oil, wheat germ oil, olive oil, corn oil, cotton seed oil, palm kernel oil, rapeseed oil, caprylic triglycerides, capric triglycerides, isostearic triglycerides, adipic triglycerides, lanolin oil and combinations thereof. Useful fats also include semi-solid vegetable oils, such as shortenings, e.g., CRISCO™, and solid fats, including, but not limited to, tallow, lard, butter, margarine and combinations thereof. In a preferred embodiment, the fat is a liquid oil. In a particularly preferred embodiment, the fat is selected from the group consisting of vegetable oils and blends thereof.

The food ingredient also comprises one or more emulsifiers. For example, the emulsifier can include, but is not limited to, monoglycerides, lecithin, enzyme modified lecithin, sorbitan esters, diacetyl tartaric acid esters of monoglycerides, propylene glycol esters, polysorbates (e.g., polysorbate 60 and polysorbate 80) and sucrose esters of medium and long chain saturated fatty acids, sorbitan monostearate, sodium stearoyl lactylate and combinations thereof. In a preferred embodiment, appropriate emulsifiers are selected from the group consisting of monoglycerides, DATEM, sorbitan monostearate, sodium stearyl lactylate, polysorbate 80 and polysorbate 60. In one preferred embodiment, the emulsifier is present in an amount of about 1% or greater by weight. In a preferred embodiment, the emulsifier is present in an amount of from about 4% by weight. In a particularly preferred embodiment, the emulsifier is present in an amount of from about 4% to about 5% by weight of the food ingredient.

The present invention also pertains to a food composition comprising a food ingredient according to the invention. In one embodiment, the food composition is a reduced-fat, low-fat or fat-free food product. Appropriate food products include, but are not limited to, dairy products, baked goods, snack foods, confections and frozen desserts. In a preferred embodiment, the food composition is a cholesterol-lowering food. In one embodiment, the food composition is selected from the group consisting of salad dressing, breads, cookies, pies, cakes, brownies, crackers, graham crackers, pretzels, noodles, margarine, butter, pudding-type desserts, sauces, cream cheese, spreads, dips, mayonnaise, sour cream, yogurt, ice cream, cheese, fudge, candy, and milk. In a preferred embodiment, the food composition is a salad dressing or margarine.

The present invention also pertains to methods of preparing a food ingredient according to the invention. In one embodiment, the method comprises the steps of heating one or more sterols, one or more fats and one or more emulsifiers together, preferably forming a homogenous mixture, and cooling the mixture under agitation, thereby producing a food ingredient of the invention. In one embodiment of this method, the sterol(s), fat(s) and emulsifier(s) are heated to the melting temperature of the sterol. For example, the heating step can be performed at a temperature of from about 130° C. to about 150° C. In a preferred embodiment, the mixture is heated to about 145° C. In one embodiment, the heated mixture is cooled to a temperature at which the mixture has a paste-like consistency. For example, the mixture can be cooled to about 60° C.

In another embodiment, the method comprises the steps of heating one or more sterols, adding one or more fats and one or more emulsifiers to form a homogeneous mixture; and cooling the mixture under agitation, thereby producing a food ingredient of the invention. In one embodiment of this method, the sterol(s) is (are) heated to its melting temperature. For example, the heating step can be performed at a temperature of from about 130° C. to about 150° C. In a preferred embodiment, the mixture is heated to about 145° C. In one embodiment, the heated mixture is cooled to a temperature at which the mixture has a paste-like consistency. For example, the mixture can be cooled to about 60° C.

The invention further relates to a method of making a food composition comprising a food ingredient according to the invention. In one embodiment, the method comprises the steps of incorporating a food ingredient prepared according to the invention into the food formulation of a desired food product and processing as necessary to form the food product.

In a another embodiment, the method comprises incorporating one or more sterols, one or more fats and one or more emulsifiers into the food formulation of a desired food product and processing as necessary to form the food product. In this embodiment, the food ingredient is prepared in situ during the formulation of the food product.

The invention also relates to non-food compositions comprising the sterol-containing ingredient of this invention, such as medicinal compositions (e.g., pills) and dietary supplements.

DETAILED DESCRIPTION OF THE INVENTION

The present invention pertains to sterol-containing ingredients useful in a variety of applications, as well as to compositions comprising the sterol-containing ingredient and methods of making the sterol-containing ingredient. According to the invention, one or more sterols are heated to their melting point; one or more fats and one or more emulsifiers are added to the sterol(s), either prior to or after heating, to produce a homogenous mixture. The homogenous mixture is cooled under agitation to produce a sterol-containing ingredient which is readily dispersible in water and/or oil without heating. Th resulting ingredient can be used to prepare a variety of compositions, including food compositions, such as reduced-fat, low-fat and fat-free food products and cholesterol-lowering food products, and non-food compositions.

As used herein, a "sterol-containing ingredient" or a "food ingredient" encompasses ingredients comprising one or more sterols, one or more fats and one or more emulsifiers. The term "food ingredient" is not intended to limit the use of the ingredient to food applications, as it will be appreciated that the ingredient can also be incorporated into medicinal compounds and dietary supplements. The food ingredient can consist essentially of one or more sterols, one or more fats and one or more emulsifiers, or can comprise one or more sterols, one or more fats and one or more emulsifiers. The ingredient can also comprise additional ingredients, such as adjunct ingredients to improve the organoleptic properties of the ingredient or additional ingredients required for a particular formulation, e.g., a food formulation. Preferably, the food ingredient is easily dispersible in water and/or oil under agitation and without heating.

The food ingredient of the invention contains one or more sterols. Appropriate sterols can be unsaturated or saturated, as can the fatty acids in sterols esterified with fatty acids, as well as mixtures thereof. These sterols are characterized by a common polycyclic steroid nucleus comprising a 17 carbon atom ring system, a side chain and a hydroxyl group. The steroid nucleus can be either saturated (a stanol), or unsaturated (a sterol). Sterols can be further derivatized by various methods known in the art, including, but not limited to, esterification of the alcohol, addition to the double bond etc. For the purposes of the invention, the term "sterol" is understood to include stanols, as well as derivatives (e.g., esters) of sterols and stanols. Examples of sterols, include, but are not limited to, sitosterols (e.g., α-sitosterols and β-sitosterols), campesterols, stigmasterols, sitostcrins (e.g., β-sitosterins) and derivatives and mixtures of these sterols. For example, derivatives can be esters of cuthea oil, corn oil, canola oil, soybean oil, lard, sunflower oil, cotton seed oil, palm oil, meadowfoam and other oil-derived fatty acid esters.

Sterols for use in the invention can be derived from plants, synthetically produced or produced by any other source such that their properties replicate those of naturally occurring sterols. Particularly preferred are native plant sterols, which have been granted GRAS status by the FDA. Plants from which sterols can be derived include, but are not limited to, meadowfoam, soybeans, oats, peas, rice, wheat, pine wood fiber, corn, canola, sunflower, cotton seed, etc. Generally, the sterol component will be present in an amount from about 30 to about 90 percent on 100% weight basis, and more preferably from about 50 to about 70 percent on 100% weight basis.

The ingredient of the invention also comprises one or more fats, including solid fats, semi-solid fats and liquid oils, as well as blends thereof. In a preferred embodiment the fat is a liquid oil. Appropriate fats can be obtained from animal sources, vegetable sources and petroleum-based sources, and the lipid can be naturally-occurring (e.g., tropical oils, animal fats, etc.) or synthetic, such as medium chain triglycerides and fats that are prepared by either partial or full hydrogenation of natural fats with or without subsequent co-esterification. The lipid component can be a triglyceride, diglyceride, monoglyceride or fatty acid. Examples of some fatty acids include oleic, palmitoleic, linoleic, linolenic, butyric, palmitic and stearic acids.

Fats useful in the present invention include liquid oils, e.g., cuthea oil, cod liver oil, castor oil, mineral oil, jojoba oil, linseed oil, tung oil, soybean oil, canola oil, avocado oil, sunflower oil, hydrogenated vegetable oil, wheat germ oil, olive oil, branched-chain hydrocarbons and alcohols and esters thereof, corn oil, cotton seed oil, palm kernel oil, rape seed oil, caprylic triglycerides, capric triglycerides, isostearic triglycerides, adipic triglycerides and lanolin oil. Useful fats also include semi-solid fats, such as shortenings, e.g., CRISCO™, and solid fats, including, but not limited to, tallow, lard, butter and margarine. Generally, the fat component will be present in an amount from about 10 to about 60 parts on 100% weight basis, and more preferably from about 25 to about 50 parts on 100% weight basis.

The ingredient of the present invention further comprises one or more emulsifiers. For example, suitable emulsifiers include, but are not limited to, monoglycerides, sorbitan esters, lecithin, diacetyl tartaric acid esters of monoglycerides (DATEM), propylene glycol esters, enzyme modified lecithin (EML), polysorbates and sucrose esters of medium and long chain saturated fatty acids. For example, emulsifiers including, but not limited to, polyethylene glycol monolaurate or glyceryl monostearate, sodium or calcium stearoyl-2-lactylate, polyoxyethylene sorbitan monostearate, sucrose monostearate and sucrose monopalmitate are suitable for use in the food ingredient of the present invention. Appropriate emulsifiers are known in the art, and many are commercially available. Particularly preferred emulsifiers include monoglycerides, DATEM, sorbitan monostearate, sodium stearyl lactylate and polysorbates (e.g., polysorbate 60 and polysorbate 80).

Emulsifiers or mixtures of emulsifiers can be selected to alter the medium in which the food ingredient is dispersible. For example, the food ingredient comprising one or more sterols, one or more fats and one or more emulsifiers may be dispersible in oil or water or both, depending on the type of emulsifier chosen. The use of emulsifiers such as monoglycerides, DATEM, sorbitan monostearate, sodium stearyl lactylate, polysorbate 80, polysorbate 60 produces a food ingredient that is dispersible in oil (see Example 3). The use of polysorbate 60 as an emulsifier results in a food ingredient which is dispersible in both water and oil (Examples 1 and 3). Thus, the skilled artisan can alter the selection of one or more emulsifiers to optimize the desired dispersibility properties of the food ingredient.

Variation of the weight percentages of the total emulsifier in a food ingredient of the present invention also results in different levels of dispersibility in water (see Example 4). For example, using polysorbate 60 as the emulsifier, food ingredients of this invention were found to have varying dispersion properties depending upon the percent by weight of the emulsifier present in the ingredient. At about 3% or less emulsifier by weight, the ingredient was observed to be variously dispersible, and the dispersion was shown to exhibit phase separation (see Table 2). At from about 4% to about 5% emulsifier by weight, the ingredient was readily dispersible, and the dispersion did not exhibit phase separation (see Table 2). At greater than about 10% emulsifier by weight, the ingredient was dispersible, and the dispersion thickened over time (see Table 2). Using these use levels as a guide, the skilled artisan can readily select appropriate use levels depending upon the food formulation desired and the emulsifier utilized in the ingredient. For example, in some applications it may be desirable to have a thickened dispersion, and the skilled artisan would adjust the use level of emulsifier(s) accordingly. Preferred levels of emulsifiers are, for example, greater than about 0.5 percent, greater than about 1 percent, greater than about 2 percent, greater than about 3 percent, and greater than about 4 percent (all by weight). Particularly preferred food ingredients comprise an emulsifier in an amount of from about 4 percent to about 5 percent by weight.

The food ingredient described herein is prepared by the following method. The sterol(s) is heated to the melting point of the sterol such that at least a substantial portion of the sterol is melted. Each of the fat and emulsifier components can either be combined with the sterol before heating and, thus, heated along with the sterol, or can be added to the melted sterol component. Combination of the fat with the sterol prior to heating can be desirable, for example, when a solid or semi-solid fat is used, as the fat will be softened or melted along with the sterol, facilitating formation of a homogenous mixture. In either embodiment, the melted sterol(s), fat(s) and emulsifier(s) form a homogeneous mixture.

The melting point of sterols varies depending upon the sterol; however, sterols derived from plants typically have a melting point ranging from about 130° C. to about 150° C. The process of heating the sterol (with or without fat and/or emulsifier) can be performed with or without agitation (e.g., stirring, sonication, vortexing, etc.). However, if the heating step is performed without agitation, agitation may be desirable after heating is complete to produce a homogenous mixture of sterol, fat and emulsifier. The heating step is carried out for a time sufficient to melt at least a substantial portion of the sterol, more preferably all of the sterol, or for a time sufficient to produce a homogeneous mixture (e.g., a liquid).

The homogenous mixture is cooled under agitation. Typically, the mixture is cooled to a temperature of from about 60° C. to about 20° C. Cooling can be carried out slowly or rapidly by any of a number of methods known in the art. The resulting food ingredient has paste-like properties and can be easily dispersed in water and/or oil under agitation without heating. Alternatively, the food ingredient can be dispersed in an appropriate dispersion medium with mild heating.

The food ingredient of the present invention can be incorporated into a composition, e.g., a food composition. Incorporation of the ingredient can be performed by incorporating the pre-formed ingredient along with the other ingredients for a given food and processing (e.g., baking, agitating, freezing, etc.) to prepare the food composition. Alternatively, the production of the food ingredient can be carried out in situ by combining one or more sterols, one or more fats and one or more emulsifiers along with the other ingredients for a given food and processing the ingredients together to prepare the food composition. The in situ method requires that the combined ingredients be heated to the melting point of the sterol, and thus, this method may be more readily suited to some food formulations than others.

The food ingredient can also be incorporated or co-processed with hydrocolloids, gums, polymers, modified starches and combinations thereof to change the rheology or increase the water binding capacity of the food compositions. For example, xanthan gum, alginate, carrageenan, carboxymethyl cellulose, methyl cellulose, guar gum, gum arabic, locust bean gum and combinations thereof can be added to the food ingredient at anytime during the preparation thereof, as long as the additional ingredients do not interfere with the formation of a homogenous mixture of sterol, fat and emulsifier. That is, these additional optional ingredients can be heated with the sterol, added prior to or after the cooling step, or during incorporation of the food ingredient into a food composition.

The food ingredient compositions of the present invention are suitable for use in a variety of food compositions to form food products. The amount of food ingredient incorporated into a food composition will depend upon the formulation of the food product; typically appropriate ranges will be from about 5% to about 20% by weight. The food ingredients are particularly useful for the preparation of reduced-fat, low-fat and fat-free food products, as well as cholesterol-lowering foods. For example, the food ingredients of this invention are suited for use in foods including, but not limited to, margarines, butters, pudding type desserts, sauces, snack dips, mayonnaise, sour cream, yogurt, ice cream, frozen desserts, cream cheese and other spreads, fudge and other confections, skim milk, salad dressing, cooking oils and shortenings. The food ingredient can be incorporated into cheeses, such as natural, processed and imitation cheeses in a variety of forms (e.g., shredded, block, slices, grated). The food ingredient is also useful in baked goods (such as breads, cakes, pies, brownies, cookies, etc.), noodles, snack items (such as crackers, graham crackers, pretzels, potato chips, etc.), and similar products.

As used herein, the terms "reduced fat", "low fat" and "fat free" are defined according to the Food and Drug Administration and the U.S.D.A. Accordingly, a product with "reduced" fat or calories has 25% less fat or calories than the standard. "Low fat" products contain 3% or less fat per serving, and "fat free" products contain less than 0.5 grams of fat per serving.

As used herein, a "cholesterol-lowering" food or agent is a food or agent which results in reduced cholesterol absorption, e.g., in the intestine, in a human or animal to which the food or agent is administered relative to the same food or agent which does not comprise the ingredient of the invention. The cholesterol-lowering food or agent may also remove excess cholesterol from the blood of the human or animal. The food or agent may affect the levels of total blood cholesterol or the levels of low-density lipoprotein (LDL) cholesterol. The ingredient of the present invention can be used, for example, in the preparation of dietary supplements and medicinal compounds for individuals having or at risk for increased cholesterol levels, such as hypercholesterolaemia.

The terms used herein have their art-recognized meaning unless otherwise defined. The teachings of references referred to herein are incorporated herein by reference. All percentages are by weight unless otherwise specified.

The following examples are offered for the purpose of illustrating the present invention and are not to be construed to limit the scope of the present invention.

EXAMPLES

Example 1
Preparation of Easily Dispersible Plant Sterol Composition

This example describes the procedure for making a water and oil dispersible food ingredient composition comprising a sterol, a fat, and an emulsifier. Fifty grams of a commercial plant sterol (Phytosterols, ADM Nutraceuticals, Decatur, Ill.) was mixed with 45 grams of vegetable oil and 5 grams of polysorbate 60 (DURFAX 60, Loders Croklaan, Glen Ellyn, Ill.) into a viscous slurry. The mixture was then heated under stirring to about 145° C. until all the sterols were melted and a homogeneous clear liquid was formed. The product was then removed from the heat source and cooled at room temperature under constant stirring. The stirring was stopped when the product reached 60° C. and turned into a thick paste. The finished product was easily dispersed in water and/or oil at room temperature under agitation to form a smooth dispersion suitable for food formulations.

Example 2
Production of a 16% Fat Salad Dressing

The food ingredient described in Example 1 can be used to produce a salad dressing according to the formulation shown in Table 1. The dressing contains 16% fat, including 8% plant sterols.

TABLE 1

| Ingredients | % |
| --- | --- |
| Water | 58.8 |
| Plant sterol composition | 16 |
| White vinegar (50 gr) | 13.5 |
| Sugar | 6 |
| Skim buttermilk solid | 2.5 |
| Salt | 1.5 |
| Dried egg yolk | 1.5 |
| Xanthan gum | 0.1 |
| Preservatives | 0.1 |

Procedure
1. Combine water and vinegar in a kitchen blender.
2. Disperse the sterol composition into the water/vinegar solution at high speed for 3 minutes.
3. Add remaining dry ingredients, as a blend, and mix for 3 minutes.
4. Package and refrigerate.

Example 3
Effect of Emulsifier Type

Five plant sterol compositions were prepared using 5 different emulsifiers following the procedure described in Example 1. The 5 emulsifiers are: monoglycerides (DMG-03, ADM, Decatur, Ill.), DATEM (Admul DATEM 1117, Quest International, Hoffman Estates, Ill.), sorbitan monostearate (DURTAN 60, Loders Croklaan, Glen Ellyn, Ill.), sodium stearyl lactylate (SSL, American Ingredients, Kansas City, Mo.), and polysorbate 80 (Spectrum Chemical, Gardena, Calif.). The five samples were evaluated for oil and water dispersibility and compared with the sample containing polysorbate 60 (see Example 1). All samples were dispersible in oil, but only the polysorbate 60 sample can be dispersed in water.

Example 4
Effect of Emulsifier Concentration

Seven plant sterol compositions, containing 0, 1, 2, 3 4, 5, and 10%, respectively, polysorbate 60, were prepared according to the method described in Example 1. Twenty grams of each sample was dispersed in 80 grams of water using a bench top homogenizer (Polytron) at 10,000 RPM. The dispersibility of each dispersion was noted and is shown in Table 2.

TABLE 2

| sample | sterols | oil | emulsifier | observation of dispersion |
| --- | --- | --- | --- | --- |
| 1 | 50% | 50% | 0% | not dispersible, phase separation |
| 2 | 50% | 49% | 1% | partially dispersible, phase separation |
| 3 | 50% | 48% | 2% | dispersible, some phase separation |
| 4 | 50% | 47% | 3% | dispersible, some phase separation |
| 5 | 50% | 46% | 4% | dispersible, no phase separation |
| 6 | 50% | 45% | 5% | dispersible, no phase separation |
| 7 | 50% | 40% | 10% | dispersible, thickened over time |

Example 5

Production of Easily Dispersible Compositions Containing Esters of Plant Sterols A β-sitosterol ester mixture was prepared following standard esterification conditions. Two hundred grams of plant sterols (60% β-sitosterol & β-sitosterin, remainder campesterol and stigmasterol), with 350 grams fatty acid methyl esters of canola oil were dried for 1 hour at 95° C. under vacuum (15 mm Hg). Esterification was catalyzed with 1 gram of sodium ethylate. After 2 hours, the catalyst was quenched with 500 ml of distilled water. The phases were separated and the oil phase dried at 95° C. with a vacuum of 15 mm Hg for 1 hour. The dry sterol fatty acid esters were bleached with 6 grams of Clarion Bleaching Earth for 20 minutes at 110° C. under 15 mm Hg vacuum. After filtration, the residual fatty acid methyl esters were removed by vacuum distillation and steam deodorization. The resulting plant sterol esters were used to prepare three easily-dispersible compositions using three emulsifiers (sodium stearoyl lactylate, polysorbate 60, and sorbitan monostearate), one emulsifier in each composition. Following the procedure in Example 1, except the temperature to which the sample was heated was 110° C. instead of 145° C. All three compositions were dispersible in oil, while only the polysorbate 60 sample was dispersible in water.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of preparing a food ingredient comprising the steps of:
   a) heating one or more sterols to their melting point;
   b) combining the product of step (a) with one or more fats and one or more emulsifiers to produce a homogeneous mixture; and
   c) cooling the homogeneous mixture under agitation, thereby producing a food ingredient.

2. The method of claim 1, wherein steps (a) and (b) are performed at a temperature of from about 130° C. to about 150° C.

3. The method of claim 1, wherein step (c) is performed at a temperature at which the mixture is a paste.

4. A food ingredient produced by the method of claim 1.

* * * * *